US008964040B2

(12) United States Patent
Tico et al.

(10) Patent No.: US 8,964,040 B2
(45) Date of Patent: Feb. 24, 2015

(54) HIGH DYNAMIC RANGE IMAGE REGISTRATION USING MOTION SENSOR DATA

(75) Inventors: Marius Tico, Mountain View, CA (US); Jianping Zhou, Fremont, CA (US); Todd S. Sachs, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 117 days.

(21) Appl. No.: 13/489,609

(22) Filed: Jun. 6, 2012

(65) Prior Publication Data

US 2013/0329087 A1 Dec. 12, 2013

(51) Int. Cl.
*H04N 5/228* (2006.01)
*H04N 5/225* (2006.01)
*H04N 7/18* (2006.01)

(52) U.S. Cl.
USPC ............... 348/208.13; 348/218.1; 348/159; 348/157

(58) Field of Classification Search
CPC . H04N 5/228; H04N 5/23245; H04N 5/2355; G06T 3/0068; G06T 3/4038
USPC ............... 348/218.1, 36, 37, 39, 42, 159, 157
See application file for complete search history.

(56) References Cited

U.S. PATENT DOCUMENTS

| | | | |
|---|---|---|---|
| 2009/0086074 A1* | 4/2009 | Li et al. ........................ | 348/308 |
| 2012/0130252 A1* | 5/2012 | Pohjanen et al. ............ | 600/476 |
| 2013/0176453 A1* | 7/2013 | Mate et al. .................. | 348/222.1 |

* cited by examiner

*Primary Examiner* — Twyler Haskins
*Assistant Examiner* — Padma Haliyur
(74) *Attorney, Agent, or Firm* — Wong, Cabello, Lutsch, Rutherford & Brucculeri, LLP

(57) ABSTRACT

Motion sensor data may be used to register a sequence of standard dynamic range images for producing a high dynamic range (HDR) image, reducing use of computational resources over software visual feature mapping techniques. A rotational motion sensor may produce information about orientation changes in the imaging device between images in the sequence of images sufficient to allow registration of the images, instead of using registration based on analysis of visual features of the images. If the imaging device has been moved laterally, then the motion sensor data may not be useful and visual feature mapping techniques may be employed to produce the HDR image.

23 Claims, 7 Drawing Sheets

HIGH DYNAMIC RANGE IMAGE REGISTRATION USING MOTION SENSOR DATA

BACKGROUND

This disclosure relates generally to the field of digital imaging. More particularly, but not by way of limitation, it relates to techniques for registering multiple images for high dynamic range imaging using motion sensor data.

Traditional photography and digital imaging take pictures of a scene at a single exposure level in the imaging device, resulting in an image with a limited contrast range. The limited contrast (or dynamic) range results in a loss of detail in bright areas of a picture if the imaging device used one exposure setting, and a loss of detail in dark areas if the imaging device used a different exposure settings. Typical image sensors do not have the dynamic range to capture the image as the human eye would see it. A common example of the effect is a photograph where the sky appears almost white, while objects on the ground are exposed sufficiently to allow seeing details of those objects.

High Dynamic Range (HDR) photography is a set of methods used in digital imaging to allow a greater dynamic range between the lightest and darkest areas of an imaging that would be possible using standard imaging techniques. This wide dynamic range allows HDR images to represent more accurately the range of intensity levels found in real scenes. Although there are multiple ways of creating HDR images, the most common technique combines images taken with different exposure settings.

Some imaging devices now allow capturing an HDR image by automatically capturing a sequence of three or more standard dynamic range images and performing HDR techniques to create an HDR image from the standard dynamic range images. The imaging device typically captures a sequence of differently exposed images of the same subject matter, each at one exposure level. The images are registered to each other, and various techniques such as tone mapping, are applied to merge a registered HDR image with better or exaggerated local contrast for artistic effect. The most common technique for registering the images is to match their visual features using software or firmware built into the camera or other imaging device. However, software registration techniques based on visual feature mapping require significant computational resources.

SUMMARY

Motion sensor data may be used to register a sequence of standard dynamic range images for producing an HDR image, reducing use of computational resources over software visual feature mapping techniques. A rotational motion sensor, such as a gyroscope or compass, may produce information about orientation changes in the imaging device between images in the sequence of images sufficient to allow registration of the images, instead of using registration based on analysis of visual features of the images. If the imaging device has been moved laterally, then the motion sensor data may not be useful and visual feature mapping techniques may be employed to produce the HDR image.

A non-transitory program storage device is disclosed. The program storage device is readable by a programmable imaging device. Instructions are stored on the device, including instructions for causing the programmable imaging device to capture a sequence of images with the programmable imaging device; and calculate registration parameters for the sequence of images. The instructions to calculate registration parameters include instructions to cause the programmable imaging device to obtain rotational orientation data associated with images of the sequence of images from an orientation sensor of the programmable imaging device; determine whether translational motion of the programmable imaging device occurred while capturing the sequence of images; calculate the registration parameters for the sequence of images responsive to the rotational orientation data if translational motion of the programmable imaging device did not occur while capturing the sequence of images; and calculate the registration parameters for the sequence of images ignoring the rotational orientation data if translational motion of the programmable imaging device occurred while capturing the sequence of images.

Another non-transitory program storage device is disclosed. The program storage device is readable by a programmable imaging device. Instructions are stored on the device, including instructions for causing the programmable imaging device to capture a sequence of images with the programmable imaging device, each of the images captured using different exposure parameters; obtain rotational orientation data associated with images of the sequence of images from an orientation sensor of the programmable imaging device; determine whether to use the rotational orientation data for registration of images of the sequence of images with each other; calculate transform parameters for the sequence of images using the rotational orientation data if the rotational orientation data is to be used for registration; calculate transform parameters for the sequence of images using data from the sequence of images if the rotational orientation data is not to be used for registration; apply the transform parameters for the sequence of images to successive images of the sequence of images; merge the sequence of images into a high dynamic range image; and output the high dynamic range image.

A programmable imaging device is disclosed. The programmable imaging device includes a programmable control device; an image sensor coupled to the programmable control device; a rotational orientation sensor coupled to the programmable control device; and a memory coupled to the programmable control device. Instructions are stored in the memory to cause the programmable control device to capture a sequence of image frames with the image sensor; and calculate registration parameters for the sequence of image frames from rotational orientation data associated with each frame of the sequence of image frames obtained from the rotational orientation sensor.

A method is disclosed. The method includes capturing a sequence of image frames with an image sensor of the programmable imaging device; and calculating registration parameters for the sequence of image frames from rotational orientation data associated with each frame of the sequence of image frames obtained from a rotational orientation sensor of the programmable imaging device.

Another programmable imaging device is disclosed. The device includes a programmable control device; an image sensor coupled to the programmable control device; a rotational orientation sensor coupled to the programmable control device; and a memory coupled to the programmable control device. Instructions are stored in the memory to cause the programmable control device to capture a sequence of image frames with the image sensor; and calculate registration parameters for the sequence of image frames from rotational orientation data associated with each frame of the sequence of image frames obtained from the rotational orientation sensor.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although described below in terms of a gyroscope, other types of rotational motion sensors may be used, including compasses.

Gyroscopes and accelerometers are available in many mobile devices. Most commonly 3-axis gyroscopes and 3-axis accelerometers are used in order to cover all potential motions in three-dimensional (3D) space. The gyroscope provides information regarding the rotational speed of the device around each of the three axes, whereas the accelerometer provides information about linear accelerations along the three axes. The gyroscope output may be integrated in order to obtain angular displacements around the three axes between two given moments in time, such as the change in device orientation between capturing two consecutive images in a sequence of images used for HDR imaging.

Figure 1:
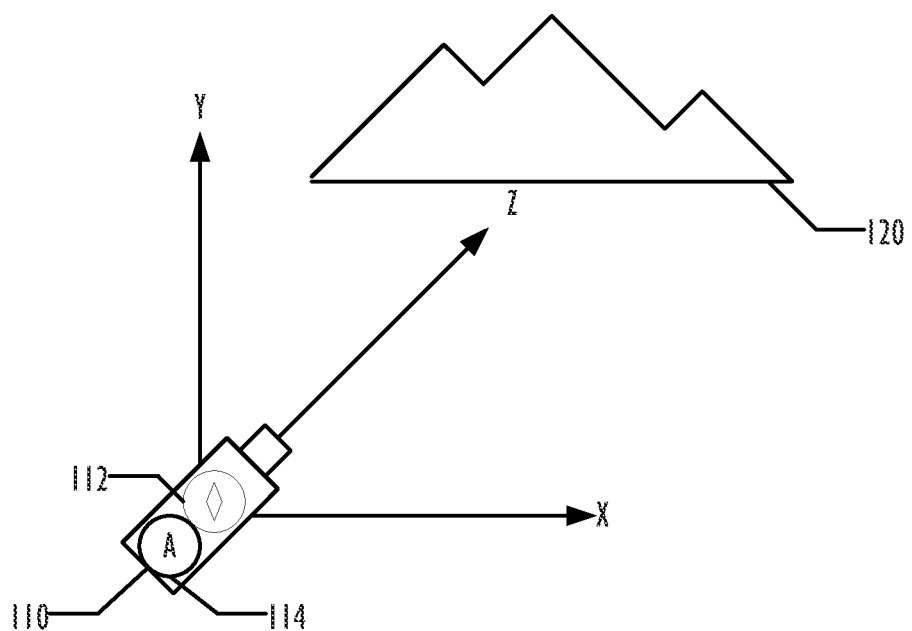
FIG. 1 is a block diagram illustrating an imaging device capturing an HDR image.

FIG. 1 is a block diagram illustrating an imaging device 110 that may be used for capturing HDR images. In this example, the imaging device 110 includes a gyroscope 112 to determine rotational orientation data and an accelerometer 114 to detect translational movement. The imaging device 110 as illustrated is configured to capture an HDR image of a scene (in this example, mountain 120) by capturing a sequence of three or more standard dynamic range (SDR) frames. Because the SDR images are taken as a sequence, movement of the imaging device 110 may occur even during the short time between successive SDR frames. The gyroscope 112 may be used to detect rotation of the imaging device about any of the X, Y, or Z axes.

The imaging device 110 may also include an accelerometer 114. The accelerometer output, unlike the gyroscope data, is integrated twice in order to estimate a potential linear translation between two different moments in time. Due to sensor noise, this double integration produces more uncertainty in the result than present in the gyroscope output. In addition, the accelerometer output is also affected by the gravitational acceleration that cannot be separated from the total detected acceleration without additional knowledge of the absolute orientation of the device. Therefore, the accelerometers are significantly less useful in detecting the translational motion of the device, and in most practical cases they are used for estimating an absolute orientation of the device with respect to the gravitational acceleration.

Figure 2:
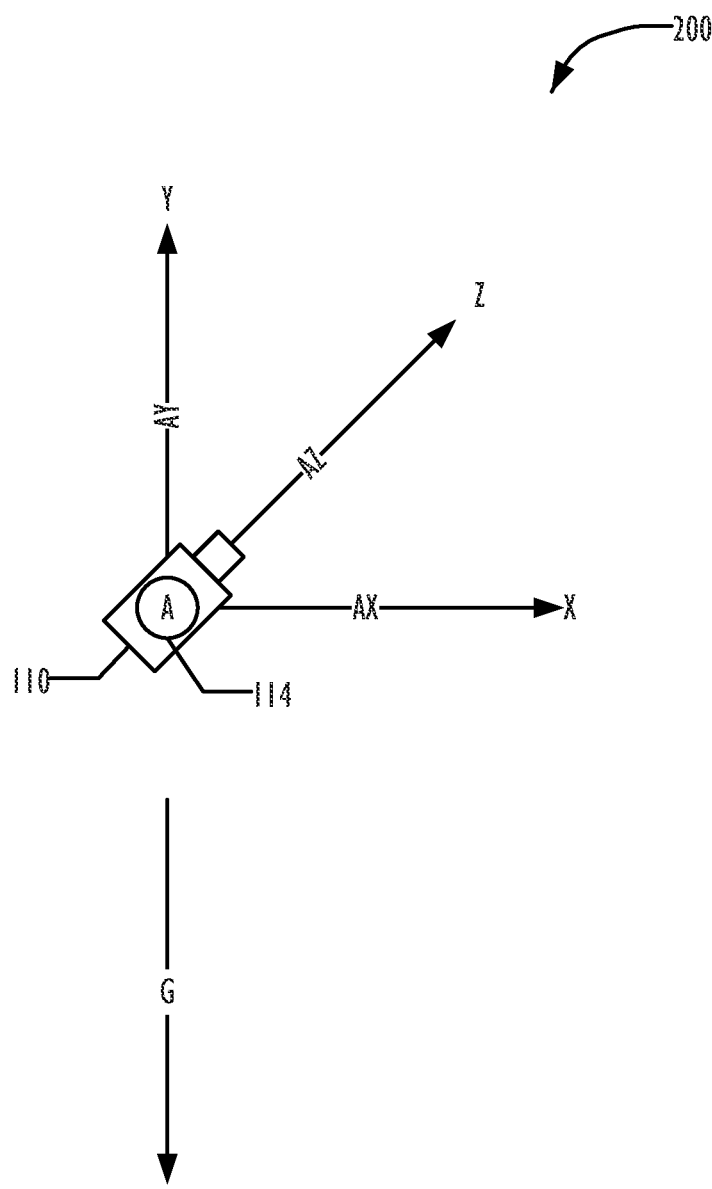
FIG. 2 is a graph illustrating axes of acceleration that may be used for determining movement of the imaging device of FIG. 1.

FIG. 2 is a graph 200 illustrating axes of lateral movement of the imaging device 110, with the Z axis in aligned with the axis of the imaging device, as in FIG. 1. Movement along the X axis involves an acceleration component $A_X$; movement along the Y axis involves an acceleration component $A_Y$; and movement along the Z axis involves an acceleration component $A_Z$. The acceleration vector A of the imaging device 110 can be expressed as a triple as follows:

$$\vec{A} = (\vec{A}_X, \vec{A}_Y, \vec{A}_Z)$$

The magnitude of the three-dimensional acceleration vector A can further be described as a vector using the following equation:

$$|\vec{A}| = \sqrt{A_X^2 + A_Y^2 + A_Z^2}$$

By comparing the magnitude and direction of the acceleration vector A to the magnitude and direction of the acceleration of gravity, we can determine whether any movement of the imaging device has occurred. If the magnitude of the acceleration is similar to that of gravity (G), so that $$|\vec{A}| \cong G$$

and the direction of the acceleration is similar to that to the acceleration of gravity, we can consider that no translational movement (movement along one or more of the X, Y, and Z axes) has occurred. As explained below, if sufficient translation of the imaging device 110 has occurred, the gyroscope data may not be usable for registering the sequence of frames to form an HDR image.

If the orientation of gravity is unknown, the magnitude of the acceleration may be used by itself to decide whether the device suddenly moved during capturing the sequence of images. In such an event of sudden movement, the magnitude of the measured acceleration will be very different from gravity, and the gyroscope data should not be used for registration.

Figure 3:
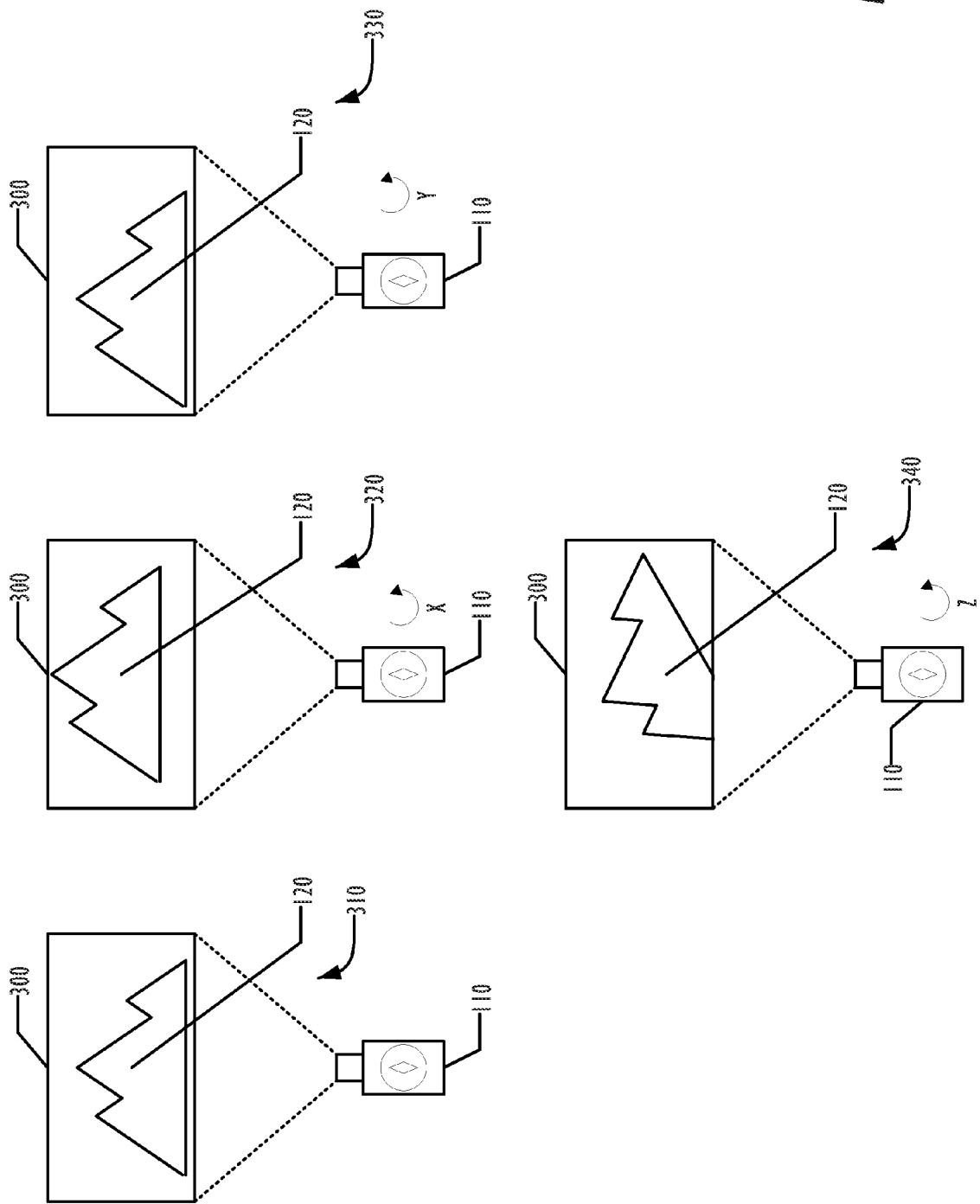
FIG. 3 is a block diagram illustrating the effect of rotation of the imaging device.

FIG. 3 is a sequence of block diagrams illustrating the effect of rotation of the imaging device 110 on the frames captured by the imaging device 110. In diagram 310, the imaging device 110 captures an image of mountain 120 in field of view 300. If the imaging device 110 rotates about the X-axis (using the orientations as illustrated in FIG. 1), the mountain 120 is translated vertically in the field of view 300 as illustrated in diagram 320. The direction of vertical movement depends on the direction of rotation. Similarly, if the imaging device 110 rotates about the Y-axis, the mountain 120 is translated horizontally in the field of view 300 as illustrated in diagram 330. If the imaging device 110 rotates about the Z-axis, the mountain 120 is correspondingly rotated in the field of view 300 as illustrated in diagram 340. Although single-axis rotations are illustrated in FIG. 3 for clarity, in actuality, the rotation of the imaging device 110 is typically about a rotation having components of rotation about more than one axis.

The amount of movement of features such as the mountain 120 in the field of view 300 caused by rotation varies according to the magnitude of the rotation of the imaging device 110, independent of the distance of the objects in the image from the imaging device. In addition, movement of features in the field of view 300 caused by translation of the imaging device 110 varies according to the magnitude of the translation and varies inversely with the distance of the objects in the field of view 300 from the imaging device 110. In a scenario where the distance to the objects in the field of view 300 is large, small linear translations of the imaging device 110 are less detectable in the captured SDR frames, and the motion between these SDR frames is mainly determined by the three rotations (pan, tilt, and roll) that can be integrated from the gyroscope data.

Where the objects in the field of view 300 are close to the imaging device 110, the effect of translational movement of the imaging device 110 may be significantly greater than the effect of rotational movement. Since the gyroscope 112 cannot detect translational movement and the data from the accelerometer 114 is too noisy, software registration based on visual features may be used to register successive SDR frames into the HDR image.

Where the objects in the field of view 300 are far away from the imaging device 110, but the imaging device is also translated during the capturing of the sequence of SDR frames, the gyroscope data, while accurate for determining the absolute orientation of the imaging device 110, may be misleading for determining a rotational relationship between the field of view 300 and the imaging device 110. For example, a person taking a photograph with an HDR camera while traveling in a moving vehicle may not be able to depend on the gyroscope data for registering the SDR frame sequence. In addition, because the accelerometer 114 may not provide useful data for accurately determining the translation of the imaging device 110, as with the close object scenario described above, software registration based on visual features may be used to register successive SDR frames into the HDR image.

Figure 4:
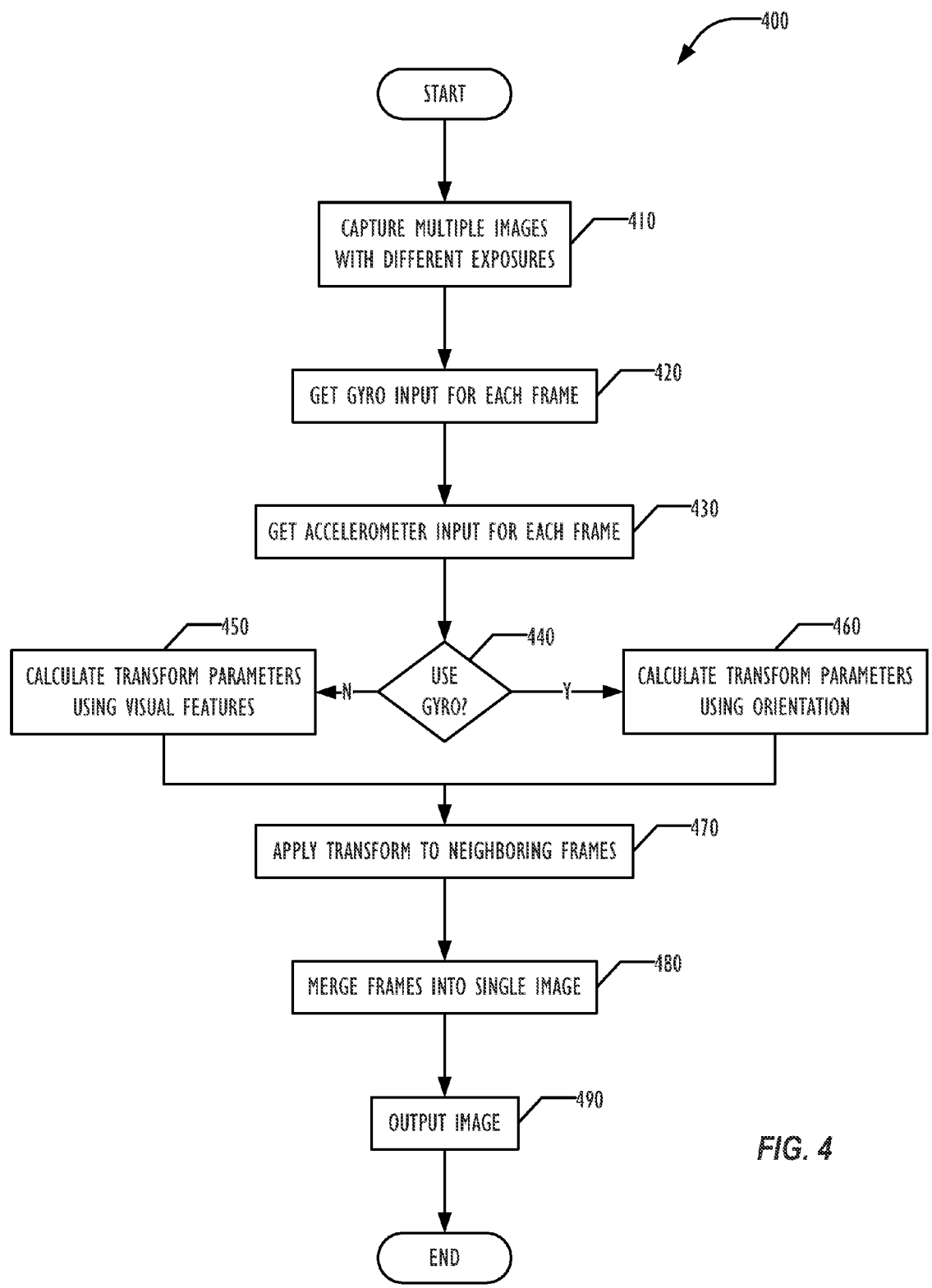
FIG. 4 is a flowchart illustrating a technique for registering images to produce an HDR image.

FIG. 4 is a flowchart illustrating a technique 400 for producing an HDR image based on the discussion above. In block 410, a sequence of SDR image frames is captured at different exposures. Typically three SDR frames are captured, although any number of frames may be captured and consolidated as desired. The frames are typically captured with very little intervening time, to minimize the likelihood of significant movement (rotational or translational) of the imaging device 110 while capturing the SDR frames.

In block 420, input from the gyroscope 112 is obtained for each frame, sufficient to determine a rotational orientation of the imaging device at the time each frame was captured. Similarly, in block 430, input from the accelerometer 114 is captured for each frame and an acceleration vector is calculated as described above. Based on the gyroscope data and the accelerometer data, in block 440 a determination is made whether to use the gyroscope data for registering the SDR image frames.

If the gyroscope data is to be used, then in block 460 transform parameters between successive image frames may be calculated using the orientation of the imaging device 110 determined from the gyroscope data. If the gyroscope data is not to be used, then in block 450 transform parameters between successive frames may be calculated by analysis of visual features of the successive frame data. Registration by visual features is known in the art and any desired technique for visual feature registration may be used.

In some implementations, even if the gyroscope data is used for an initial registration, the initial registration may be verified and refined using the visual features registration techniques of block 450, using a small search space defined about the registration parameters derived from the orientation data. Such a refinement may be useful for registration of objects that are relatively close to the imaging device, such as capturing an image inside of a structure, where translational movement may be more relevant than when imaging other scenes such as landscapes relatively distant from the imaging device 110.

Once the transform parameters are calculated, whether from gyroscope data or visual feature analysis, the transform parameters may be used in block 470 as registration parameters to register successive frames of the sequence of SDR frames. The registered SDR frames may then in block 480 be used to merge the SDR frames, generating an HDR frame. Merger of registered SDR frames into an HDR frame is known to the art and any desired technique for merging registered frames, including tone-mapping techniques, may be used.

The HDR image may then be output in block 490, displaying the image to a user and/or storing the HDR image on a storage medium. In some implementations, the sequence of SDR frames may be preserved along with the HDR image; in other implementations the SDR frame sequence may be discarded once the HDR image is generated.

Figure 5:
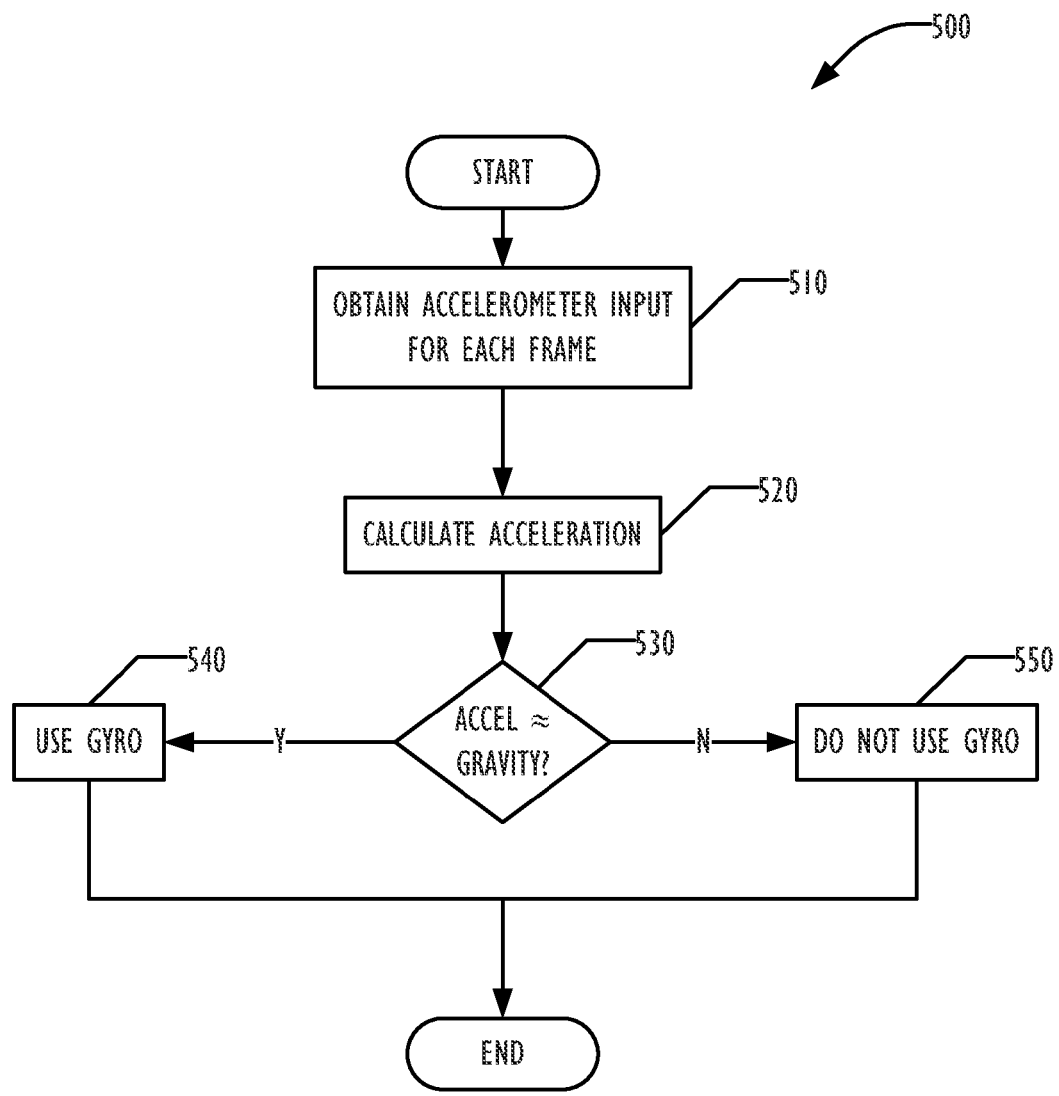
FIG. 5 is a flowchart illustrating a technique for determining whether gyroscopic data may be used for registering frames to produce an HDR image.

FIG. 5 is a flowchart illustrating a technique 500 for determining whether the gyroscope data may be used for registering the SDR frames with each other. In block 510, translational motion data in the form of accelerometer data is obtained for each frame in the SDR frame sequence. In block 520, the acceleration vector and its magnitude are calculated as described above. In block 530, if the magnitude of the acceleration is approximately equal to that of gravity, then translation effects may be ignored and an indication that the gyroscope data may be used is generated in block 540. Otherwise, translation effects may not be ignored, and an indication that the gyroscope data may not be used may be generated in block 550. As describe above, even if the gyroscope data may be used, a limited visual feature analysis may be performed to improve on the gyroscope data information for scenarios such as where the imaging device captures close objects.

In some implementations, the acceleration of the imaging device is compared with the acceleration of gravity, and if the difference exceeds a predetermined threshold value, translational of the imaging device may be considered to have occurred and the translational effects may not be ignored.

Implementation in an Electronic Device

Figure 6:
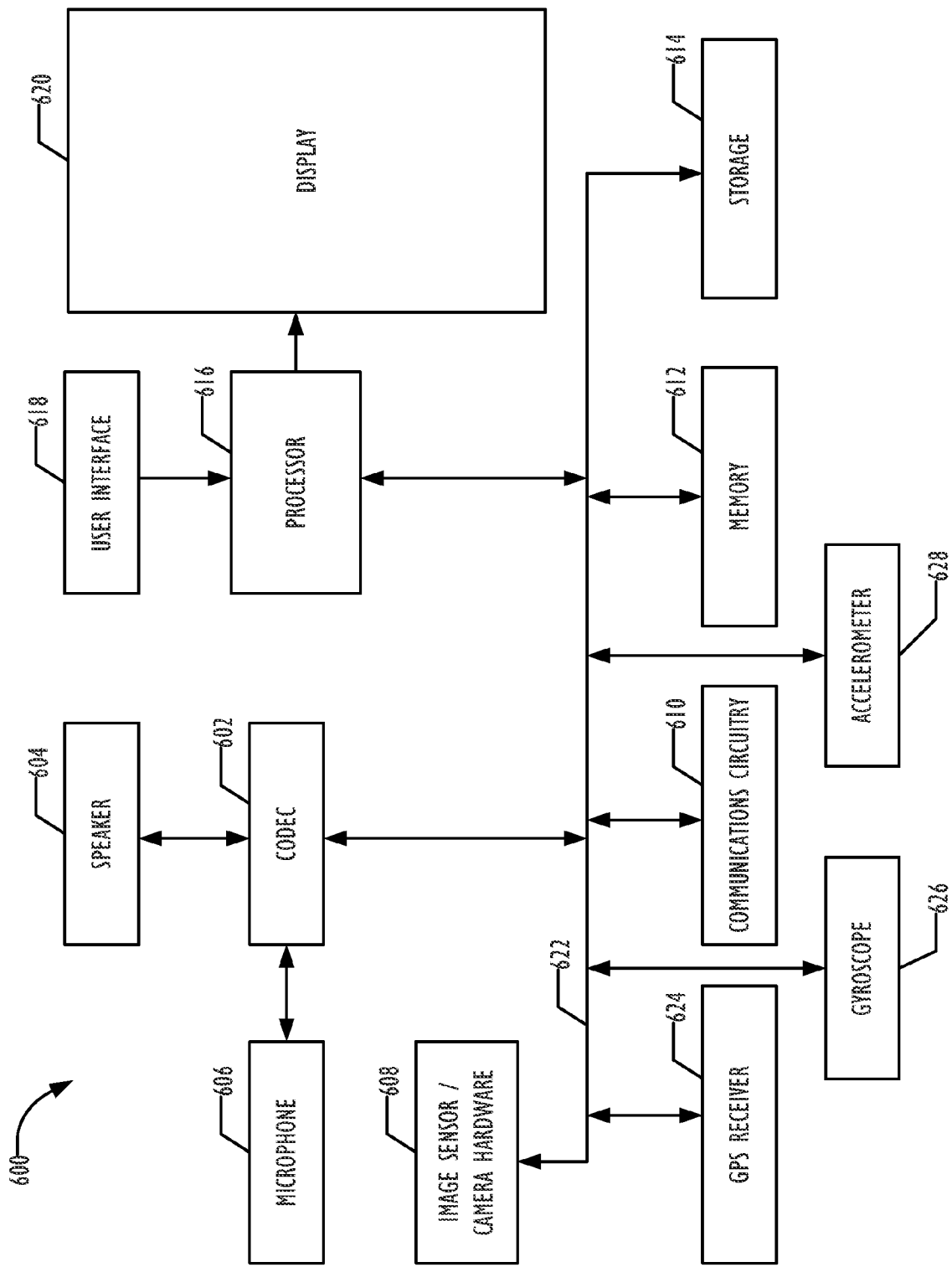
FIG. 6 is a block diagram illustrating a programmable device for capturing HDR images.

FIG. 6 is a simplified functional block diagram illustrating an electronic device FIG. 600 according to one embodiment that can implement the techniques described above. The electronic device FIG. 600 may include a processor FIG. 616, display FIG. 620, microphone FIG. 606, audio/video codecs FIG. 602, speaker FIG. 604, communications circuitry FIG. 610, an image sensor with associated camera hardware FIG. 608 for performing image capture, user interface FIG. 618, memory FIG. 612, storage device FIG. 614, and communications bus FIG. 622. Processor FIG. 616 may be any suitable programmable control device and may control the operation of many functions, such as the generation and/or processing of image data, as well as other functions performed by electronic device FIG. 600. Processor FIG. 616 may drive display FIG. 620 and may receive user inputs from the user interface FIG. 618. An embedded processor provides a versatile and robust programmable control device that may be utilized for carrying out the disclosed techniques. A gyroscope 626 and an accelerometer 628 may also be included to generate rotational and acceleration information using the techniques described above.

Storage device FIG. 614 may store media (e.g., image and video files), software (e.g., for implementing various functions on device FIG. 600), preference information, device profile information, and any other suitable data. Storage device FIG. 614 may include one more storage mediums for tangibly recording image data and program instructions, including for example, a hard-drive, permanent memory such as ROM, semi-permanent memory such as RAM, or cache. Program instructions may comprise a software implementation encoded in any desired language (e.g., C or C++).

Memory FIG. 612 may include one or more different types of memory which may be used for performing device functions. For example, memory FIG. 612 may include cache, ROM, and/or RAM. Communications bus FIG. 622 may provide a data transfer path for transferring data to, from, or between at least storage device FIG. 614, memory FIG. 612, and processor FIG. 616. Although referred to as a bus, communications bus FIG. 622 is not limited to any specific data transfer technology. User interface FIG. 618 may allow a user to interact with the electronic device FIG. 600. For example, the user interface FIG. 618 can take a variety of forms, such as a button, keypad, dial, a click wheel, or a touch screen.

In one embodiment, the electronic device FIG. 600 may be an electronic device capable of processing and displaying media, such as image and video files. For example, the electronic device FIG. 600 may be a device such as such a mobile phone, personal data assistant (PDA), portable music player, monitor, television, laptop, desktop, and tablet computer, or other suitable personal device.

The description above is written in terms of using analysis of visual features for software-based registration techniques in the event that the hardware-based gyroscope data is not usable or insufficient for accurate registration of the SDR frames. For example, in one implementation, corners of one image may be detected and their corresponding positions in the other image may be used to register the frames without use of the hardware data obtained from the gyroscope. Other software-based techniques for registering successive frames of the SDR sequence may be used as desired.

Figure 7:
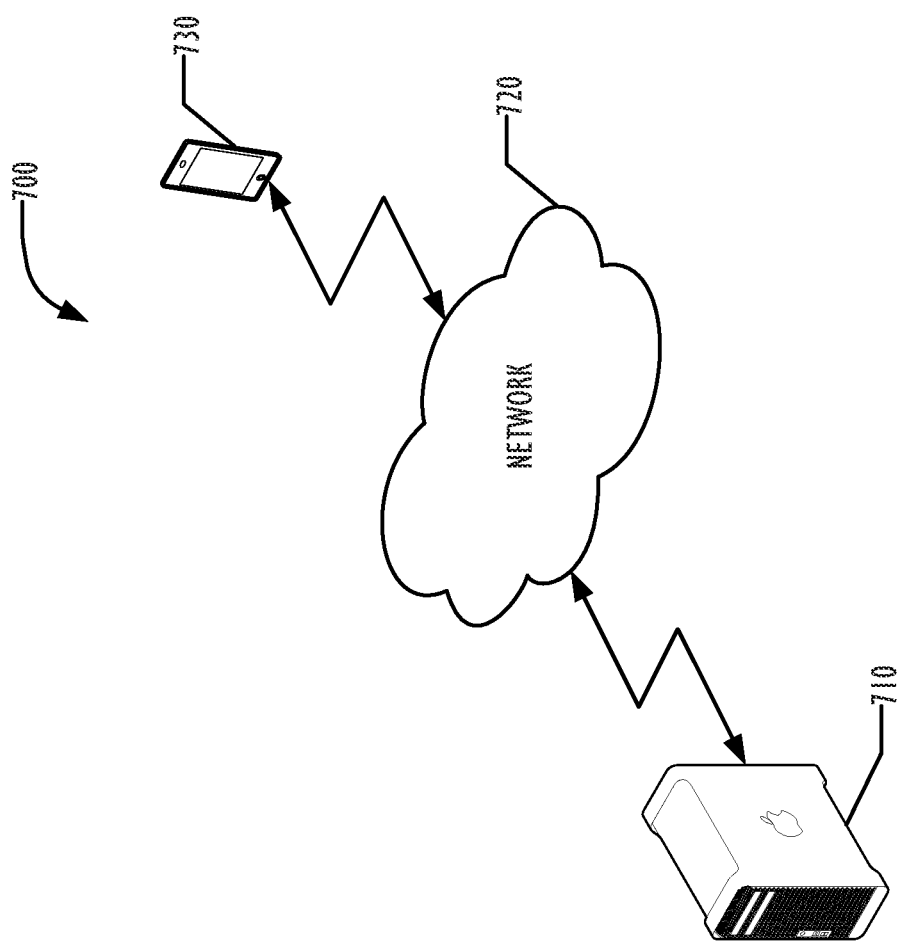
FIG. 7 is a block diagram illustrating a networked system in which one device uses resources of another device for generating the HDR image.

In addition, although the typical implementation is configured to capture the SDR image sequence and generate the HDR image on the same device, the processing may be separated as desired. For example, FIG. 7 illustrates a system 700 in which a mobile device 730 such as a smart phone captures the sequence of SDR image frames, but instead of generating the HDR image on the mobile device 730, the sequence of SDR image frames and associated motion sensor data is transmitted to a desktop computer 710 via one or more connecting networks 720. The desktop computer 710 may then use the techniques described above to register the sequence of SDR images and generate an HDR image.

Although described above in terms of generating HDR images from a sequence of images, the techniques of registering a sequence of images using motion sensor data described above may be used for other purposes, such as stitching together images to form a panoramic image.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory program storage device, readable by a programmable imaging device, comprising instructions stored thereon to cause the programmable imaging device to:
   capture a sequence of images with a programmable imaging device;
   obtain rotational orientation data associated with images of the sequence of images from an orientation sensor of the programmable imaging device;
   determine whether translational motion of the programmable imaging device occurred during capture of the sequence of images;
   calculate registration parameters for the sequence of images responsive to the rotational orientation data when translational motion of the programmable imaging device was determined not to have occured during capture of the sequence of images; and
   calculate the registration parameters for the sequence of images ignoring the rotational orientation data when translational motion of the programmable imaging device was determined to have occured during capture of the sequence of images.

2. The non-transitory program storage device of claim 1, comprising instructions for further causing the programmable imaging device to:
   register the sequence of images using the registration parameters; and
   merge the sequence of images into a high dynamic range image.

3. The non-transitory program storage device of claim 2, comprising instructions for further causing the programmable imaging device to output the high dynamic range image.

4. The non-transitory program storage device of claim 3, comprising instructions for further causing the programmable imaging device to discard the sequence of images.

5. The non-transitory program storage device of claim 1, wherein the orientation sensor comprises a gyroscope.

6. The non-transitory program storage device of claim 1, wherein the instructions for causing the programmable imaging device to determine whether translational motion of the programmable imaging device occurred during capture of the sequence of images comprise instructions for causing the programmable imaging device to:
   calculate an acceleration of the programmable imaging device; and
   compare the acceleration of the programmable imaging device with an acceleration of gravity.

7. The non-transitory program storage device of claim 6, wherein the instructions for causing the programmable imaging device to determine whether translational motion of the programmable imaging device occurred during capture of the sequence of images further comprise instructions for causing the programmable imaging device to determine that translational motion of the programmable imaging device occurred when the acceleration of the programmable imaging device differs from the acceleration of gravity by at least a predetermined threshold value.

8. The non-transitory program storage device of claim 1, wherein the instructions causing the programmable imaging device to capture a sequence of images with the programmable imaging device comprise instructions for causing the programmable imaging device to capture each image of the sequence of images with different exposure parameters.

9. A non-transitory program storage device, readable by a programmable imaging device, comprising instructions stored thereon for causing the programmable imaging device to:
  capture a sequence of images with a programmable imaging device, each image of the sequence of images captured using different exposure parameters;
  obtain rotational orientation data associated with the images of the sequence of images from an orientation sensor of the programmable imaging device;
  obtain translational motion data associated with the images of the sequence of images from an accelerometer of the programmable imaging device;
  calculate an acceleration of the programmable imaging device based on output from the accelerometer;
  determine whether the acceleration of the programmable imaging device approximates an acceleration of gravity;
  indicate that the rotational orientation data is to be used for registration when the acceleration of the programmable imaging device approximates the acceleration of gravity;
  indicate that the rotational orientation data is not to be used for registration when the acceleration of the programmable imaging device does not approximate the acceleration of gravity;
  calculate transform parameters for the sequence of images using the rotational orientation data when the rotational orientation data was determined to be used for registration;
  calculate transform parameters for the sequence of images using the translational motion data when the rotational orientation data was determined not to be used for registration;
  apply the transform parameters for the sequence of images to successive images of the sequence of images;
  merge the sequence of images into a high dynamic range image; and output the high dynamic range image.

10. The non-transitory program storage device of claim 9, wherein the instructions for causing the programmable imaging device to determine whether the acceleration of the programmable imaging device approximates an acceleration of gravity comprise instructions for causing the programmable imaging device to:
  compare the acceleration of the programmable imaging device with the acceleration of gravity; and
  determine the acceleration of the programmable imaging device approximates the acceleration of gravity if the comparison indicates that the acceleration of the programmable imaging device differs from the acceleration of gravity by less than a predetermined threshold value.

11. A programmable imaging device, comprising:
  a programmable control device;
  an image sensor coupled to the programmable control device;
  a rotational orientation sensor coupled to the programmable control device; and
  a memory coupled to the programmable control device, wherein instructions are stored in the memory, the instructions for causing the programmable control device to:
  capture a sequence of image frames with the image sensor;
  obtain rotational orientation information associated with the sequence of image frames from the rotational orientation sensor;
  determine whether translational motion of the programmable imaging device occurred while capturing the sequence of image frames;
  calculate registration parameters for the sequence of image frames from the rotational orientation information when it has been determined that translational motion of the programmable imaging device did not occur during capture; and
  calculate registration parameters for the sequence of image frames ignoring the rotational orientation information when it has been determined that translational motion of the programmable imaging device occurred during capture of the sequence of image frames.

12. The programmable imaging device of claim 11, further comprising an accelerometer coupled to the programmable control device, wherein the instructions for causing the programmable control device to ignore the rotational orientation information are based on output from the accelerometer indicating that translational motion of the programmable imaging device occurred while capturing the sequence of image frames.

13. The programmable imaging device of claim 11, wherein the memory further comprises instructions for causing the programmable control device to:
  apply the registration parameters for the sequence of image frames to successive image frames of the sequence of image frames;
  merge the sequence of image frames into a high dynamic range image; and
  output the high dynamic range image.

14. The programmable imaging device of claim 11, wherein the memory further comprises instructions for causing the programmable control device to calculate registration parameters for the sequence of image frames from visual feature information contained within the sequence of image frames.

15. The programmable imaging device of claim 14, wherein the instructions for causing the programmable control device to calculate registration parameters for the sequence of image frames from visual feature information contained within the sequence of image frames comprise instructions for causing the programmable control device to use the visual feature information only if it has been determined that translational motion of the programmable imaging device occurred during capture of the sequence of image frames.

16. The programmable imaging device of claim 15, wherein the memory further comprises instructions for causing the programmable control device to modify the registration parameters for the sequence of image frames calculated from the rotational orientation data with the registration parameters for the sequence of image frames calculated from the visual feature information contained within the sequence of image frames.

17. A method, comprising:
  capturing a sequence of image frames with an image sensor of a programmable imaging device;
  obtaining rotational orientation data associated with images of the sequence of image frames from an orientation sensor of the programmable imaging device;
  determining whether the programmable imaging device experienced translational motion during capture of the sequence of image frames;
  calculating, when translational motion of the programmable imaging device is determined not to have occured, registration parameters for the sequence of image frames responsive to the rotational orientation data; and calculating, when translational motion of the programmable imaging device is determined to have occured, registration parameters for the sequence of image frames ignoring the rotational orientation data.

18. The method of claim 17, further comprising merging the sequence of image frames into a high dynamic range image based on the registration parameters.

19. The method of claim 18, further comprising outputting the high dynamic range image.

20. An imaging device, comprising:
a programmable control device;
an image sensor coupled to the programmable control device;
a rotational orientation sensor coupled to the programmable control device;
an acceleration sensor coupled to the programmable control device; and
a memory coupled to the programmable control device, wherein instructions are stored in the memory, the instructions configured to cause the programmable control device to:
  capture a sequence of image frames with the image sensor;
  obtain, from the rotational orientation sensor, rotational orientation information associated with images of the sequence of image frames;
  determine, based on output from the acceleration sensor, whether the programmable imaging device experienced translational motion during capture of the sequence of image frames;
  calculate, when translational motion of the programmable imaging device is determined not to have occured, registration parameters for the sequence of image frames based on the rotational orientation information; and
  calculate, when translational motion of the programmable imaging device is determined to have occured, registration parameters for the sequence of image frames ignoring the rotational orientation information and based on content of the images of the sequence of image frames.

21. The imaging device of claim 20, further comprising instructions stored in the memory, configured to cause the programmable control device to:
  apply the registration parameters for the sequence of image frames to successive images of the sequence of image frames;
  merge the sequence of image frames into a high dynamic range image; and
  output the high dynamic range image.

22. The imaging device of claim 20, wherein the instructions stored in the memory configured to cause the programmable control device to calculate registration parameters based on the content of the images comprise instructions configured to cause the programmable control device to use visual feature information from the images of the sequence of image frames.

23. The imaging device of claim 22, further comprising instructions stored in the memory configured to cause the programmable control device to
  modify the registration parameters for the sequence of image frames based on the rotational orientation information with the registration parameters for the sequence of image frames based on the visual feature information contained within the images of the sequence of image frames.

* * * * *